United States Patent Office 3,482,936
Patented Dec. 9, 1969

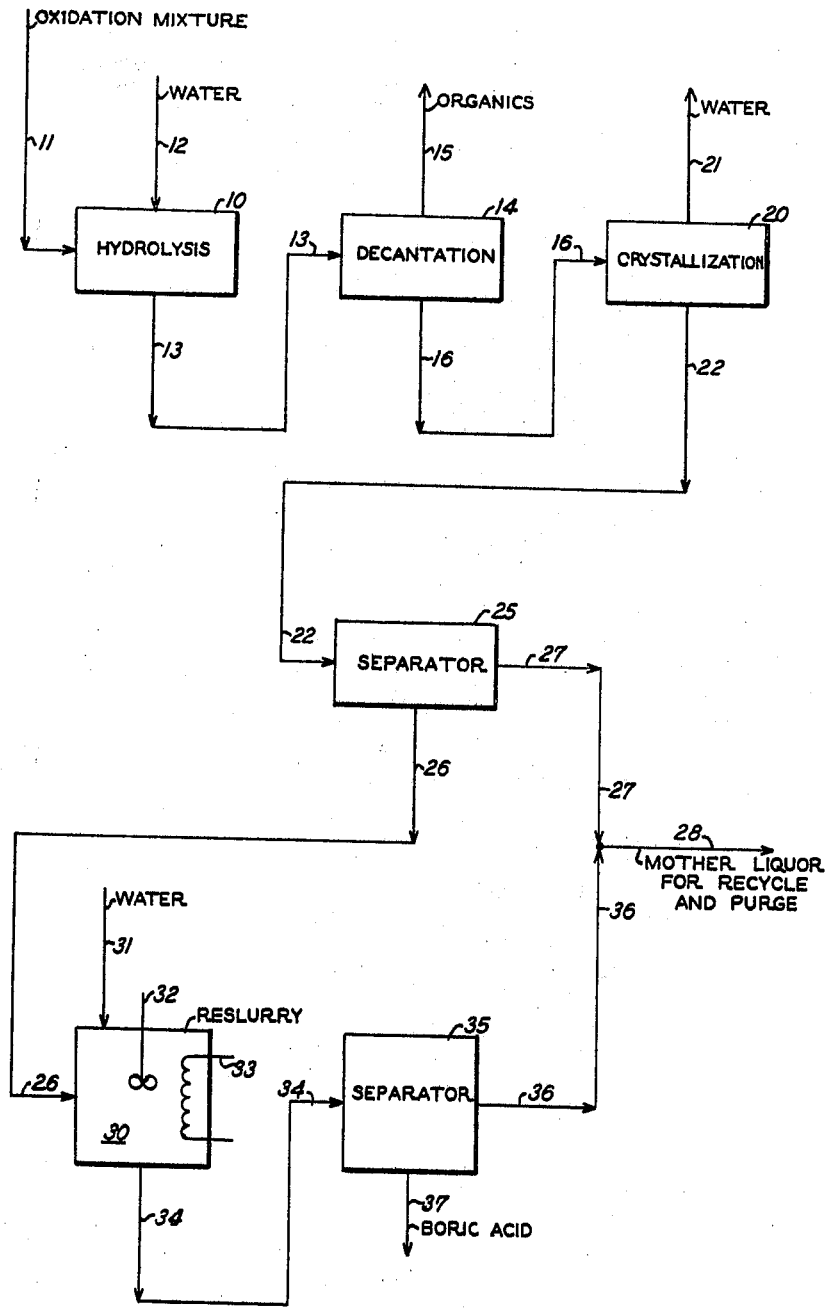

3,482,936
PURIFICATION OF BORIC ACID
Joseph L. Russell, Ridgewood, N.J., assignor to Halcon
  International, Inc., a corporation of Delaware
Filed Dec. 11, 1967, Ser. No. 689,658
Int. Cl. C01b 35/00
U.S. Cl. 23—149                               4 Claims

ABSTRACT OF THE DISCLOSURE

This invention relates to a process for the removal of adhered organic compounds from boric acid and more particularly to the removal of organic compounds which become associated with boric acid during hydrocarbon oxidations in the presence of boron adjuvant compounds. The adhered organic compounds are removed from the boric acid by slurrying the boric acid in water and maintaining the thus-formed slurry at a temperature within the range from about 0° C. to about 60° C. for a period of at least about 2 minutes. The process of this invention permits the recovery of boric acid from the effluents of such oxidations with sufficient purity to permit the economic recycle and reuse of boron adjuvant compounds in further hydrocarbon oxidations.

BACKGROUND OF THE INVENTION

It is well known that hydrocarbons can be directly oxidized with molecular oxygen containing gases to produce oxygenated organic derivatives of great commercial importance. It is also known that boron compounds which esterify with alcohols formed during the oxidation are advantageously employed in such oxidations as adjuvants to provide improved selectivity in the conversion of such hydrocarbons to the desired products, most commonly the monofunctional alcohol and ketone derivatives of the hydrocarbon being oxidized. Such processes are disclosed, for example, by Winnick, U.S. Pat. No. 3,243,449.

In the commercial practice of such processes, it is readily apparent that, for the process to be economically attractive, the boron compounds must be recovered and recycled to the oxidation. However, this presents problems to the art. Conventional recovery techniques are efficient in that substantially all of the boron compounds present in the oxidation reactor effluent can be recovered but, when such recovery techniques are employed and the boron compounds are recovered and recycled to the oxidation, the selectivity of the oxidation reaction to the desired products decreases rapidly. Indeed, so rapid is this decline in selectivity that after as few as three or four such recycles, the selectivity becomes too low for continuance of the oxidation to be economic.

It has been found that this decline in selectivity is due to the build-up of impurities which are preferentially associated with the boron compounds. These impurities are difficult to separate completely from the boron compounds and even a few percent of such impurities are sufficient to seriously impair the efficiency of the oxidation. The nature of these impurities has not been fully elucidated; but in the case of cyclohexane oxidation, hydroxycaproic, succinic, adipic and glutaric acids are among the impurities deleterious to the oxidation process.

In addition to causing a decline in reaction selectivity, the presence of impurities associated with the boron compounds seems also to be associated with the formation and settling out of organic solids during the course of the reaction. Unless the formation of these solids is minimized, they can cause equipment plugging which is deleterious to continued operation and can also cause product contamination problems.

As a palliative for this problem, as disclosed in copending application Ser. No. 205,186 filed June 26, 1962, it is possible to purge a portion of the boron compounds from the recycle and to add fresh boron compound as make-up in order to prevent impurities build-up. But, this causes losses of the boron compounds and substantially increases the expense of operation of the process. Moreover, any attempt to reduce the amount of boron compound purged from the system results in greatly lowered oxidation reaction selectivity. Thus, there is a twofold problem; impurities must be removed from the system and this must be done without substantial loss of the boron compounds.

SUMMARY OF THE INVENTION

It has been found that by the process of this invention, boric acid recovered from the effluent from such hydrocarbon oxidations can be readily and economically treated for the removal of adhered impurities and that the so-treated boric acid contains a sufficiently low level of impurities to allow the recycle and reuse of the boric acid in further hydrocarbon oxidations with selectivities of the hydrocarbon oxidation remaining at levels approaching that achieved with fresh boron adjuvant compounds. According to this invention, recovered, solid, particulate boric acid is admixed with water to form a slurry. The boric acid is maintained in suspension at a temperature between about 0° C. and about 60° C. for a period of for at least about 2 minutes. Thereafter, the boric acid is separated from the water and is suitable for the recycle to the oxidation.

Surprisingly, it has been found that the slurring of the boric acid in water is not the equivalent of washing the recovered solid boric acid in the form of a cake. Thus, for example, and contrary to that which would normally be expected, the insertion of a water-washing stage during the recovery of boric acid by centrifugation or the water-washing of a boric acid filter cake produces results which are much less satisfactory than those which are produced by the practice of this invention. Such in situ water washings are effective to some extent in reducing impurities levels by, for example, as much as 50%; however, the slurrying operation of this invention is effective to reduce the amount of adhered impurities by as much as a factor of six in but a single slurrying operation.

DETAILED DESCRIPTION OF THE INVENTION

To place my invention in its proper context, it is first necessary to describe the oxidation reaction. A hydrocarbon in liquid phase together with a boron adjuvant compound such as meta boric acid is charged to a reactor and contacted with a molecular oxygen-containing gas at reaction conditions until the desired conversion is obtained. Usually from 5 to 15% of the hydrocarbon is converted per pass, though higher or lower conversions can be obtained. Typical oxidation temperatures are in the range from about 150° C. to about 200° C. Typical pressures are from about atmospheric to 1000 p.s.i.g., depending, for example, on the hydrocarbon being oxidized and are preferably from about 100 p.s.i.g. to about 200 p.s.i.g. The preferred boron compounds employed in such oxidations are boric acids (ortho and meta boric acids) boric acid esters (such as the ester of meta boric acid with the mono-alcohol derivative of the hydrocarbon being oxidized, e.g., cyclododecanyl meta borate when cyclododecane is the hydrocarbon being oxidized) and boric anhydrides (e.g., $B_2O_3$ and $B_4O_5$). Mixtures of these boron adjuvent compounds (as they are referred to hereinafter) can also be employed. Of the various boron adjuvant compounds mentioned, meta boric acid is preferred.

Suitable hydrocarbon feeds to the oxidation reaction are those saturated hydrocarbons having from 4 to and including 20 carbon atoms per molecule. This includes mixtures of such hydrocarbons. Thus, aliphatic and alicyclic hydrocarbons such as, for example, cyclohexane, methyl cyclohexane, cycloheptane, cyclooctane, dimethyl cyclohexanes, n-pentane, n-hexane methyl pentanes, methyl butane, cyclododecane, eicosane, $C_{12}$ to $C_{14}$, petroleum naphtha, $C_{14}$ to $C_{18}$, petroleum naphthas, and the like can be employed. In the context of this application it is not necessary that the feed be entirely free of unsaturated materials, such as cyclohexene, so long as the feed consists essentially of saturated hydrocarbons, i.e., more than about 95% (mol basis) saturated. Similarly, small amounts of sulfur and nitrogen-containing compounds, present as impurities, can also be part of the hydrocarbon feed.

At the present time, the most widely practiced embodiment of the hydrocarbon oxidation reaction is the oxidation of cyclohexane to a mixture of cyclohexanol and cyclohexanone; hence, the process of the invention will be described using cyclohexane oxidation as an illustrative embodiment, it being understood that the invention is not limited to this feed but is broadly applicable to any of the feeds referred to hereinabove.

During the oxidation of the hydrocarbon (cyclohexane or any of the other hydrocarbons referred to hereinabove) the majority of the hydrocarbon is converted to a borate ester of the corresponding monofunctional alcohol and to ketone. It is believed that an alcohol is formed during the oxidation which then esterifys with the boron adjuvant compound to form a borate ester, e.g., cyclohexyl borate. An alternate route could be for cyclohexyl hydroperoxide to react with the boron compound to give a peroxyborate which then reacts to form cyclohexyl borate. Thus, when cyclohexane is oxidized, the reactor effluent contains primarily unreacted cyclohexane, cyclohexyl borate, cyclohexanone, cyclohexyl peroxyborate or cyclohexyl hydroperoxide, and small amounts of undesirable by-products, deleterious to the later recovery and re-use of the boron compound. Such mixtures of products and unreacted feedstock are hereinafter referred to in this specification and in the appended claims as borate ester-containing hydrocarbon oxidation mixtures.

The borate ester containing hydrocarbon oxidation mixture is then hydrolyzed, thereby converting the borate ester to the free alcohol and to ortho boric acid. The main oxygenated products are recovered as product and the boric acid is recovered for recycle to the hydrocarbon oxidation. This invention resides in the manner of recovery and in the treatment of the ortho boric acid obtained in this hydrolysis.

The borate ester-containing hydrocarbon oxidation mixture is hydrolyzed by admixing it with an aqueous stream in a hydrolysis reactor. The resultant admixture is withdrawn from the reactor after the hydrolysis is substantially complete and it is separated into an aqueous phase and an oxygenated organic phase containing the desired oxygenated products, viz., cyclohexanol and cyclohexanone, together with unreacted cyclohexane. The boric acid is separated with the aqueous phase. If sufficient water is used, all of the boric acid can be dissolved in the aqueous phase; otherwise, a portion thereof precipitates as a solid. Also present in this aqueous phase are impurities which if returned to the oxidation zone interfere with the oxidation reaction as above mentioned.

Recovery of the boric acid proceeds by separating the boric acid from the aqueous phase by, for example, crystallization followed by centrifugation or filtration. In accord with the process of this invention, the boric acid, which contains appreciable amounts of organic impurities is removed from the centrifuge of filter and is then admixed with water to form a slurry. The amount of water used in this slurrying is from 1 part of water to about 20 parts of water per part by weight of solid boric acid being employed. If less than this amount of water is used, there is danger that the amount of impurities removed by this slurrying operation will be insufficient to permit recycle and reuse of the boric acid. If amounts of water substantially in excess of that hereinabove indicated are employed, the loss of boric acid during this slurrying operation can become excessive from the standpoint of process economics. The thus-formed slurry is then maintained at a temperature between 0° C. and about 60° C. and is preferably maintained within the limits of 20 to 40° C. for, preferably, at least 3 minutes. Following this, the boric acid and water are separated from one another. The boric acid can then be processed for recycle to the oxidation by, for example, dehydration of the ortho boric acid to meta boric acid.

The water from the slurrying operation contains oxygenated impurities removed from the boric acid and also contains substantial amounts of boric acid in solution. Since it is normally not economic to discard this material, because of its boric acid content, this water is usually combined with the mother liquor resulting from the initial boric acid crystallization and centrifugation or filtration. The combined water streams can then be re-used, as such, in the hydrolysis or can be treated for recovery of boric acid dissolved therein. Normally both will be done, i.e., the majority of the mother liquor, including water from the slurrying operation, will be re-used in the hydrolysis reaction, but a small amount will be purged after being subjected to treatment (e.g., evaporative crystallization) for recovery of additional boric acid.

DRAWING

Suitable practice of the present invention is described in connection with the embodiment schematically illustrated in the accompanying drawing. Referring to the drawing, a borate ester-containing hydrocarbon oxidation mixture, obtained by the molecular oxygen oxidation of a hydrocarbon such as cyclohexane in the presence of a suitable boron adjuvant compound such as metaboric acid is introduced to hydrolysis zone 10 via conduit 11. A water-containing stream is added to hydrolysis zone 10 via conduit 12. In zone 10, the borate ester-containing hydrocarbon oxidation mixture is hydrolyzed to liberate the desired oxygenated products, namely cyclohexanol and cyclohexanone when cyclohexane is the hydrocarbon being oxidized, and also to liberate the boron adjuvant compound in the form of orthoboric acid.

The hydrolysis mixture is removed from hydrolysis zone 10 via conduit 13 and is passed to decantation zone 14 wherein the hydrolysis mixture is separated into an upper organic phase containing the unreacted hydrocarbon together with the alcohol and ketone products of oxidation and into a lower aqueous boric acid phase. The upper phase is removed from decantation zone 14 via conduit 15 and is treated in accordance with known procedures for the recovery of the valuable alcohol and ketone products and also for the recovery of unreacted hydrocarbon which is advantageously recycled to the hydrocarbon oxidation.

The lower aqueous boric acid phase is withdrawn from decantation zone 14 via conduit 16 and thence passes to crystallization zone 20. In crystallization zone 20 the aqueous boric acid phase is treated so as to crystallize boric acid from solution. One technique for accomplishing this is, for example, by evaporative crystallization. By this technique water vapor is removed from crystallization zone 20 via conduit 21 leaving within crystallization zone 20 a slurry of boric acid in water. This slurry is withdrawn from crystallization zone 20 via conduit 22 and is passed to solids-liquid separator 25. In solids-liquid separator 25, which can be a centrifuge or a filter, boric acid crystals are separated from the residual mother liquor. The boric acid crystals are withdrawn from the solids-liquid separator via conduit 26 and passed to slurry tank 30. The mother liquor is withdrawn from the solids-liquid separator 25 via conduit 27 and can conveniently be recycled through suitable conduits (not shown) to the hydrolysis zone 10 via conduit 12.

The boric acid crystals are, as indicated above, introduced to slurry tank 30 via conduit 26. Water, for re-slurrying, is also added to the slurry tank via conduit 31. Slurry tank 30 is also conveniently equipped with a suitable agitator, 32, to maintain the boric acid in suspension therewithin. In accordance with this invention the temperature within slurry tank 30 is maintained within the range between 0° C. and about 60° C. by any means convenient to those skilled in the art such as, for example, by adjustment of the temperature of the water introduced to slurry tank 30 through conduit 31 or by provision of cooling coils, 33, within the slurry tank. Slurry tank 30 is sized so as to provide a residence time of the boric acid therewithin of at least 2 minutes.

The slurry is withdrawn from slurry tank 30 via conduit 34 and is separated in solids-liquid separator 35 which is also a centrifuge or a filter. Water containing some dissolved boric acid and also containing the bulk of the oxygenated impurities adhering to the boric acid feed to slurry tank 30 is withdrawn from solids-liquid separator 35 via conduit 36 and is conveniently recycled to the hydrolysis zone 10 via suitable conduits (not shown). Boric acid of sufficient purity for recycle and re-use in the hydrocarbon oxidation whence the borate ester-containing hydrocarbon oxidation mixture was obtained is withdrawn from solids-liquid separator 35 via conduit 37. This boric acid can be recycled to oxidation if desired and can be converted to meta boric acid if desired prior to the recycle.

EXAMPLE

The process is further described in the following example which is intended only as illustrative and not as limiting of the invention. Unless otherwise indicated, all parts and percentages are by weight. Quantities stated as parts are to be understood as parts per hour.

A borate ester-containing hydrocarbon oxidation mixture is prepared by the continuous, liquid phase, air oxidation of cyclohexane in the presence of meta boric acid. Temperature of oxidation is 165° C. and pressure is 123 p.s.i.a. The oxidation is controlled such that the partial pressure of water in the vent gases leaving the reactor is 3.9 p.s.i.a. and that of oxygen is 3.2 p.s.i.a.

Six hundred thirty-five and one-half parts of the borate ester-containing hydrocarbon oxidation mixture, prepared as described above, are charged continuously to a hydrolysis reactor. This feed contains approximately 86% of unreacted cyclohexane, one percent of cyclohexanone, and 10.8% of cyclohexyl borate with the balance comprising impurities with a trace (0.1%) of unreacted meta boric acid. Also charged continuously to the hydrolysis reactor are 279 parts of an aqueous boric acid containing stream and 0.6 part of ortho boric acid (88.8%) cake recovered from the hydrolysis reactor effluent in a manner described subsequently. The aqueous boric acid-containing stream has the following composition: water 82.6%, cyclohexanol plus cyclohexanone 0.9%, ortho boric acid 6.4%, with the balance consisting largely of other organics, including undesired impurities. The hydrolysis reaction is carried out at 80° C. until essentially all the ester in the borate ester-containing hydrocarbon oxidation mixture is hydrolyzed which is accomplished with an average residence time in the hydrolysis reactor of ½ to ¾ of an hour.

The effluent from the hydrolysis reactor, containing substantially no borate ester is decanted to produce an oxygenated organics stream (624.9 parts) containing the desired cyclohexanol and cyclohexanone products together with unreacted cyclohexane. The aqueous phase (286.6 parts) contains substantially all the boric acid in solution. A portion of the aqueous phase is then cooled to 43° C. while under vacuum (total pressure=60 mm. Hg) and the boric acid is thereby crystallized from solution and recovered by centrifugation. In this manner the aqueous phase is separated into a solid, boric acid-containing phase (11.3 parts) in the form of a cake in the centrifuge and a mother liquor stream (40.27 parts). The boric acid is analyzed and found to contain 88.5% of ortho boric acid, 9.3% water and 2.2% of oxygenated organic impurities—a level too high to permit continued economic reuse of the boric acid in hydrocarbon oxidations. The mother liquor stream is recycled to the hydrolysis.

The solid boric acid is withdrawn from the centrifuge and is mixed with 15.04 parts of an aqueous stream maintained at 43° C. The resultant slurry is maintained at 43° C. for 5 minutes during which time the slurry is subjected to agitation to keep the boric acid in suspension. The aqueous stream contains 5.65% boric acid, 2.46% organic impurities with the balance being water and is made up of 5.25 parts of fresh, make-up water, the balance being a recycle stream derived in a manner to be described.

The slurry is then withdrawn and centrifuged to recover boric acid for recycle to the hydrocarbon oxidation. In this manner, 10.59 parts of boric acid containing only 0.04 part of organic impurity is obtained. (This recovered boric acid also contains 1.05 parts of water.) This boric acid is suitable for recycle to hydrocarbon oxidation after dehydration to meta boric acid. The liquid obtained from this centrifugation is withdrawn and divided into two portions. The first portion (5.96 parts) is withdrawn and added to the mother liquor used for hydrolysis of the borate ester-containing hydrocarbon oxidation mixture. The balance (9.79 parts) is recycled to the slurrying operation.

It is to be noted that substantially all of the boric acid is recovered (or internally recycled) while the impurities in the boric acid are reduced in the slurrying operation of this invention by a factor of six.

CONTROL

The above example is repeated without the reslurrying operation but employing a water wash of the boric acid while still in the centrifuge. The impurities are reduced by only a factor of 2 even though the centrifuge wash stage employs the same amount of water as is used in the reslurry operation of the example. The boric acid obtained in this control is unsuited for recycle and reuse in the oxidation.

The foregoing description illustrates the methods of this invention whereby the flexibility and the advantages thereof are obtained. It will be understood that modifications and variations thereof may be effected by those skilled in the art without departing from the spirit of my invention. Accordingly, it is intended that all matter contained in the foregoing description shall be interpreted as illustrative and not in a limiting sense.

What is claimed:

1. A method for removing adhered organic compounds from boric acid derived by hydrolysis of a borate ester-containing hydrocarbon oxidation mixture formed by the liquid phase molecular oxygen oxidation of a $C_4$–$C_{20}$ hydrocarbon in the presence of a boron adjuvant compound which comprises admixing the boric acid so prepared in solid particulate form with from about 1 to about 20 parts by weight of water per part by weight of said boric acid thereby forming a slurry of boric acid in water, maintaining the thus-formed slurry at a temperature between about 0° C. and about 60° C. for a period of at least about 2 minutes while maintaining the boric acid in suspension and thereafter separating the boric acid from the water.

2. A process in accordance with claim 1 wherein the borate ester component of the borate ester-containing hydrocarbon oxidation mixture is predominantly cyclohexyl metaborate and the adhered organic compounds comprise at least one member of the group consisting of hydroxycaproic acid, succinic acid, adipic acid and glutaric acid.

3. A process in accordance with claim 1 wherein the hydrocarbon is cyclohexane and the adhered organic compounds comprise at least one member of the group consisting of hydroxycaproic acid, succinic acid, adipic acid and glutaric acid.

4. A process in accordance with claim 1 wherein the hydrocarbon is dodecane.

References Cited

UNITED STATES PATENTS

| | | | |
|---|---|---|---|
| 2,789,884 | 4/1957 | Rodden et al. | 23—149 |
| 2,833,623 | 5/1958 | May et al. | 23—149 |

HERBERT T. CARTER, Primary Examiner

U.S. Cl. X.R.

260—462, 631, 617